United States Patent
Zorgui et al.

(10) Patent No.: US 12,507,315 B2
(45) Date of Patent: Dec. 23, 2025

(54) NON-UNIFORM-INTEGER POSITIONING AND/OR SENSING BEHAVIOR

(71) Applicant: QUALCOMM Incorporated, San Diego, CA (US)

(72) Inventors: Marwen Zorgui, San Diego, CA (US); Ahmed Elshafie, San Diego, CA (US); Diana Maamari, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 18/180,339

(22) Filed: Mar. 8, 2023

(65) Prior Publication Data

US 2024/0306244 A1  Sep. 12, 2024

(51) Int. Cl.
*H04W 76/28* (2018.01)
*H04W 52/02* (2009.01)
*H04W 64/00* (2009.01)

(52) U.S. Cl.
CPC ....... *H04W 76/28* (2018.02); *H04W 52/0229* (2013.01); *H04W 64/00* (2013.01)

(58) Field of Classification Search
CPC . H04W 76/28; H04W 52/0229; H04W 64/00; H04W 52/0235; H04W 52/0216; H04L 5/0048; H04L 5/0051
See application file for complete search history.

(56) References Cited

U.S. PATENT DOCUMENTS

| | | | |
|---|---|---|---|
| 2010/0323683 A1* | 12/2010 | Kazmi | H04W 24/10 455/422.1 |
| 2019/0182794 A1 | 6/2019 | Wong et al. | |
| 2019/0313454 A1* | 10/2019 | Pu | H04W 24/02 |
| 2021/0360733 A1 | 11/2021 | Bao et al. | |
| 2022/0399976 A1* | 12/2022 | Wang | H04L 5/0092 |
| 2023/0041767 A1 | 2/2023 | Manolakos et al. | |

FOREIGN PATENT DOCUMENTS

| | | |
|---|---|---|
| EP | 3952482 A1 | 2/2022 |
| EP | 4156797 A1 | 3/2023 |
| WO | 2022028467 A1 | 2/2022 |

OTHER PUBLICATIONS

International Search Report and Written Opinion—PCT/US2024/014391—ISA/EPO—Jun. 3, 2024.

* cited by examiner

*Primary Examiner* — Kabir A Timory

(74) *Attorney, Agent, or Firm* — QUALCOMM Incorporated

(57) ABSTRACT

A method, for at least one of positioning or sensing, includes: operating a UE in a non-uniform integer DRX mode having non-uniform integer DRX cycles; and performing, at the UE, at least one of a positioning operation or a sensing operation, corresponding to a reference signal, based on the UE operating in the non-uniform integer DRX mode.

24 Claims, 9 Drawing Sheets

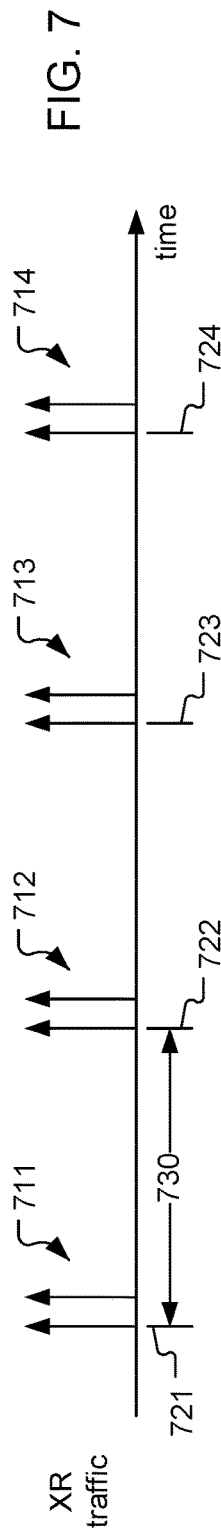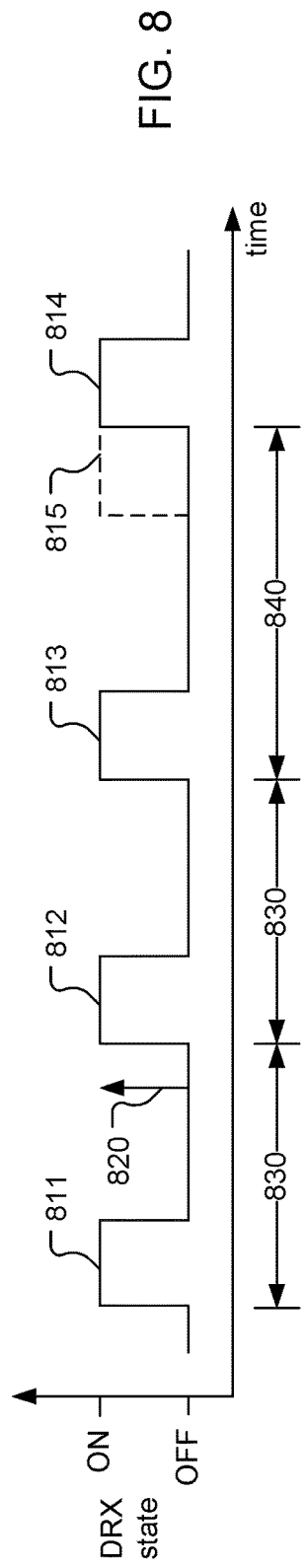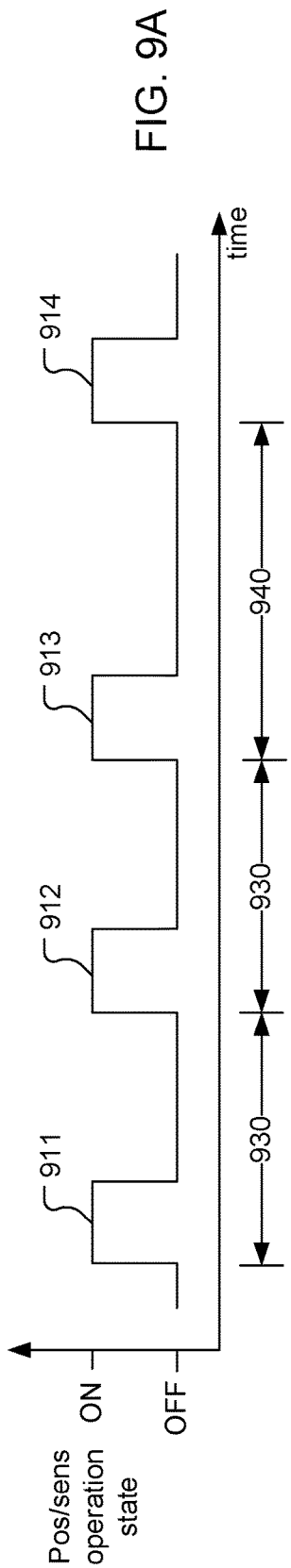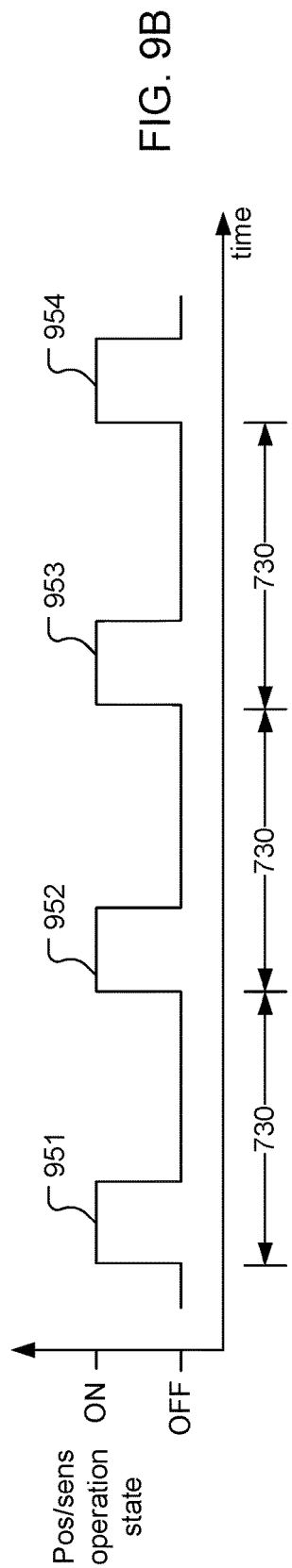

NON-UNIFORM-INTEGER POSITIONING AND/OR SENSING BEHAVIOR

BACKGROUND

Wireless communication systems have developed through various generations, including a first-generation analog wireless phone service (1G), a second-generation (2G) digital wireless phone service (including interim 2.5G and 2.7 5G networks), a third-generation (3G) high speed data, Internet-capable wireless service, a fourth-generation (4G) service (e.g., Long Term Evolution (LTE) or WiMax®), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

In addition to communication capabilities of devices (e.g., mobile devices), obtaining the locations of mobile devices that are accessing a wireless network may be useful for many applications including, for example, emergency calls, personal navigation, asset tracking, locating a friend or family member, etc. Existing positioning methods include methods based on measuring radio signals transmitted from a variety of devices or entities including satellite vehicles (SVs) and terrestrial radio sources in a wireless network such as base stations and access points.

SUMMARY

An example user equipment includes: a memory; a transceiver; and a processor, communicatively coupled to the memory and the transceiver, configured to: operate in a non-uniform integer discontinuous reception (DRX) mode having non-uniform integer DRX cycles; and perform at least one of a positioning operation or a sensing operation, corresponding to a reference signal, based on the processor operating in the non-uniform integer DRX mode.

An example method, for at least one of positioning or sensing, includes: operating a UE in a non-uniform integer DRX mode having non-uniform integer DRX cycles; and performing, at the UE, at least one of a positioning operation or a sensing operation, corresponding to a reference signal, based on the UE operating in the non-uniform integer DRX mode.

Another example UE includes: means for operating in a non-uniform integer DRX mode having non-uniform integer DRX cycles; and means for performing at least one of a positioning operation or a sensing operation, corresponding to a reference signal, based on the UE operating in the non-uniform integer DRX mode.

An example non-transitory, processor-readable storage medium includes processor-readable instructions to cause a processor of a UE to: operate in a non-uniform integer DRX mode having non-uniform integer DRX cycles; and perform at least one of a positioning operation or a sensing operation, corresponding to a reference signal, based on the UE operating in the non-uniform integer DRX mode.

An example network entity includes: a memory; a transceiver; and a processor, communicatively coupled to the memory and the transceiver, configured to: determine a reference signal configuration for a reference signal, with the reference signal configuration having at least one non-uniform-integer spacing between start times corresponding to at least one pair of consecutive transmissions of the reference signal; and transmit, via the transceiver to a user equipment, a configuration message indicating the reference signal configuration.

An example reference signal configuration method includes: determining, at a network entity, a reference signal configuration for of a reference signal, with the reference signal configuration having at least one non-uniform-integer spacing between start times corresponding to at least one pair of consecutive transmissions of the reference signal; and transmitting, from the network entity to a user equipment, a configuration message indicating the reference signal configuration.

Another example network entity includes: means for determining a reference signal configuration for of a reference signal, with the reference signal configuration having at least one non-uniform-integer spacing between start times corresponding to at least one pair of consecutive transmissions of the reference signal; and means for transmitting, from the network entity to a user equipment, a configuration message indicating the reference signal configuration.

Another example non-transitory, processor-readable storage medium includes processor-readable instructions to cause a processor of a network entity to: determine a reference signal configuration for of a reference signal, with the reference signal configuration having at least one non-uniform-integer spacing between start times corresponding to at least one pair of consecutive transmissions of the reference signal; and transmit, from the network entity to a user equipment, a configuration message indicating the reference signal configuration.

BRIEF DESCRIPTION OF THE DRAWINGS

FIG. 7 is a timing diagram of ON durations with start times that are uniformly spaced by a non-integer quantity of slots.

FIG. 8 is a timing diagram of ON durations with start times that are spaced by different integer quantities of slots.

FIG. 9A is a timing diagram of ON durations with start times that are spaced by cycles times of different integer numbers of slots.

FIG. 9B is a timing diagram of ON durations with start times that are spaced by uniform non-integer spacings, that are unequal to an integer number of slots.

DETAILED DESCRIPTION

Figure 1:
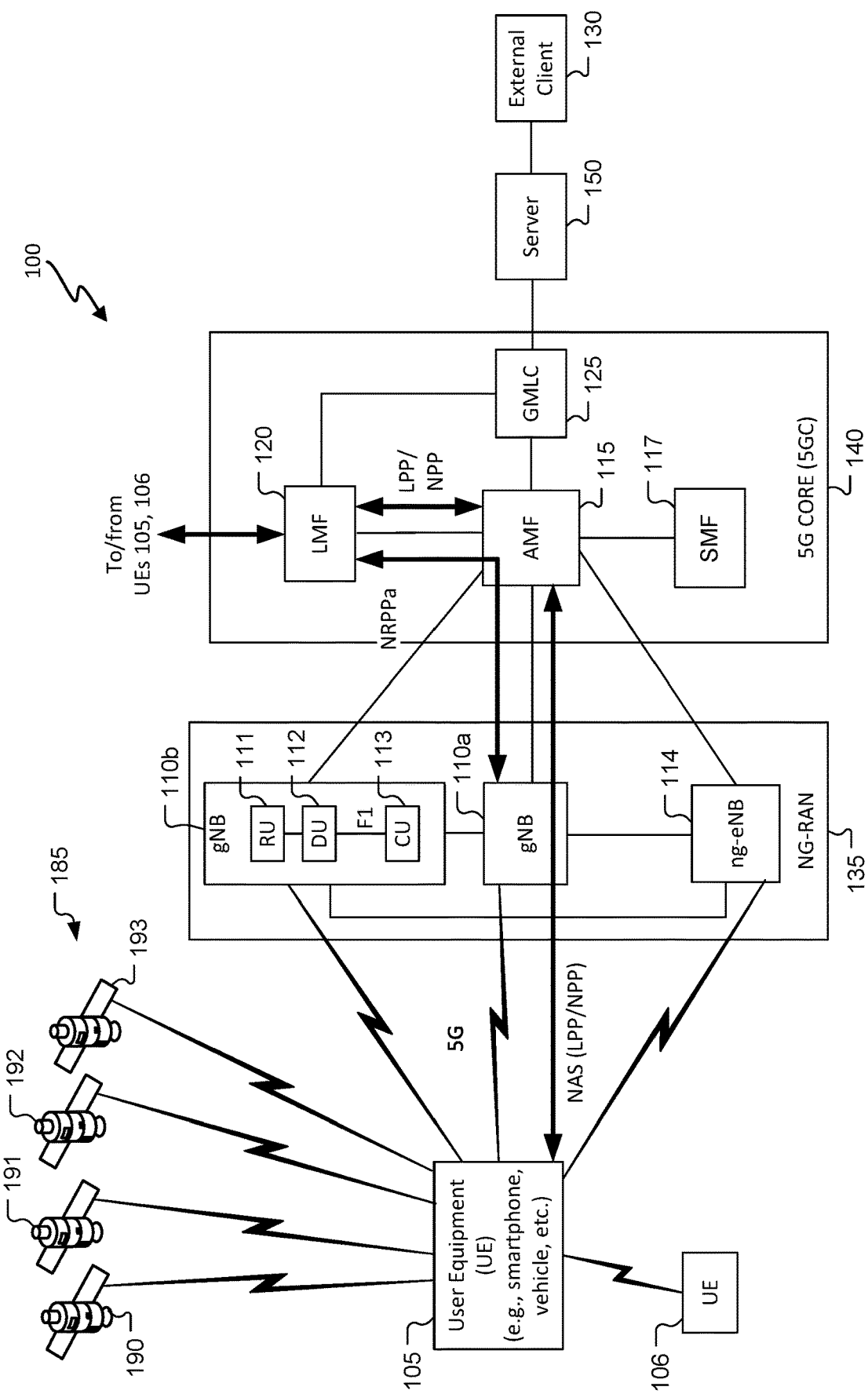
FIG. 1 is a simplified diagram of an example wireless communications system.

Techniques are discussed herein for positioning and/or RF sensing behaviors in the presence of discontinuous reception (DRX) mode operation. For example, a user equipment may operate in a non-uniform integer DRX mode where separations of start times of ON durations of the user equipment include different integer quantities of slots. A user equipment may determine a positioning operation and/or a sensing operation (e.g., whether to perform an operation, how to perform an operation, and/or when to perform the operation), and perform the positioning operation and/or sensing operation, based on the user equipment operating in the non-uniform integer DRX mode. A positioning operation and/or a sensing operation may be referred to as a positioning/sensing operation. A user equipment may perform a positioning operation and/or a sensing operation in a non-uniform-integer manner, with repeated operations separated by non-uniform integer numbers of slots (i.e., different integer quantities of slots) and/or separated by times not equal to an integer number of slots. A network entity may determine and distribute a non-uniform-integer reference signal configuration for transmissions of reference signal occasions separated by a non-integer number of slots and/or multiple separations being separated by different times, e.g., different integer quantities of slots or different times that are unequal to an integer number of slots. Other configurations, however, may be used.

Items and/or techniques described herein may provide one or more of the following capabilities, as well as other capabilities not mentioned. Power may be saved for positioning and/or sensing operations, e.g., by aligning (at least partially) one or more positioning operations and/or one or more sensing operations with non-uniform integer DRX cycles. Positioning/sensing operations may accommodate non-uniform-integer traffic. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, a UE may be any wireless communication device (e.g., a mobile phone, router, tablet computer, laptop computer, consumer asset tracking device, Internet of Things (IoT) device, etc.) used to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi® networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi®, WiFi®-Direct (WiFi®-D), Bluetooth®, Bluetooth®-low energy (BLE), Zigbee®, etc. One or more base stations, e.g., one or more of the gNBs 110a, 110b and/or the ng-eNB 114 may be configured to communicate with the UE 105 via multiple carriers. Each of the gNBs 110a, 110b and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi® communication, multiple frequencies of Wi-Fi® communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi® (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi® (also referred to as Wi-Fi®), Bluetooth®(BT), Worldwide Interoperability for Microwave Access (WiMax®), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi® Direct (WiFi®-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g., the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110b includes an RU 111, a DU 112, and a CU 113. The RU 111, DU 112, and CU 113 divide functionality of the gNB 110b. While the gNB 110b is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110b. The DU 112 hosts the Radio Link Control (RLC), Medium Access Control (MAC), and physical layers of the gNB 110b. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110b. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS or PRS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi® AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi® access for the UE 105 and may comprise one or more WiFi® APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi® APs, an MME, and an E-SMLC.

As noted, in some embodiments, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the position of the UE.

Figure 2:
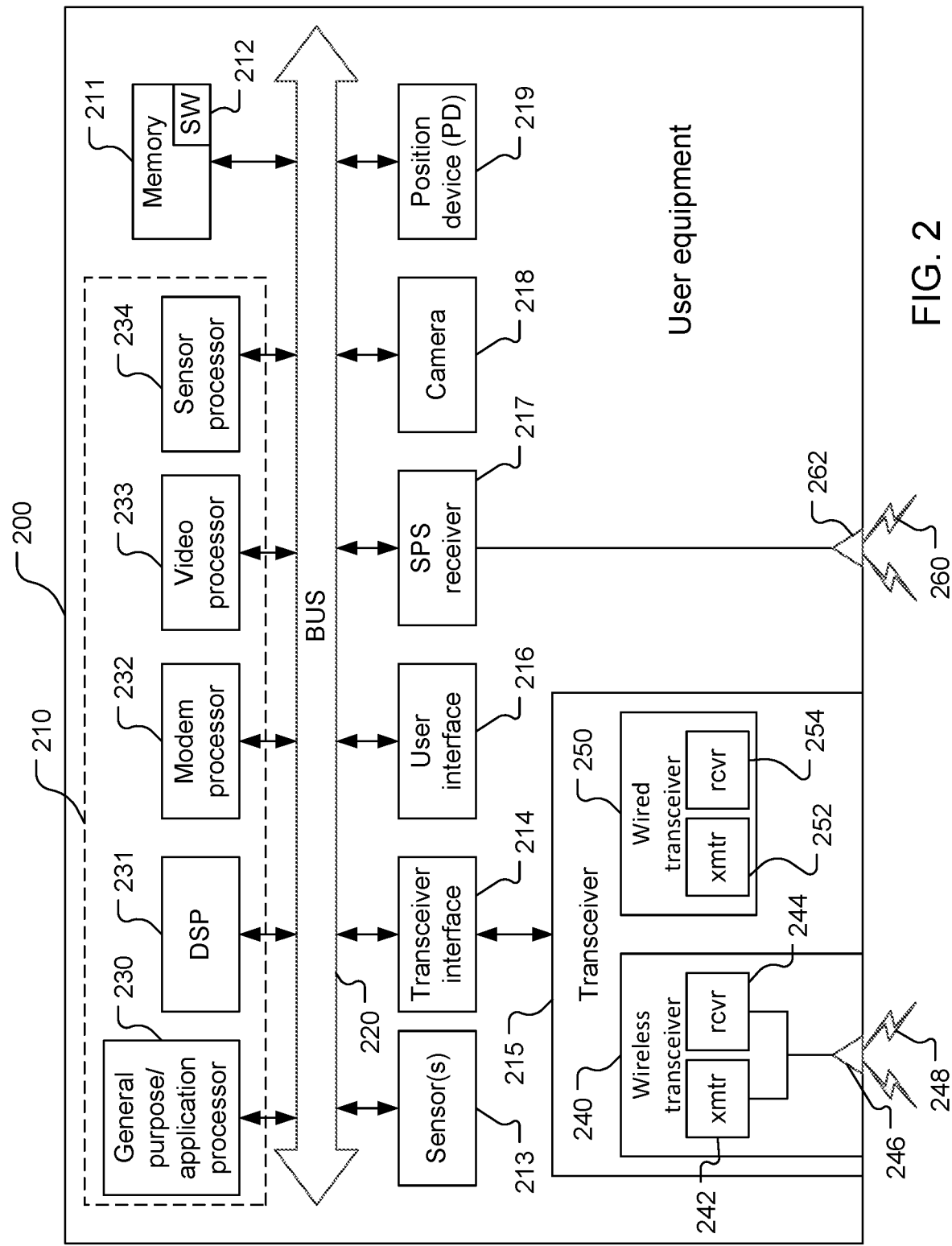
FIG. 2 is a block diagram of components of an example user equipment shown in FIG. 1.

Referring also to FIG. 2, a UE 200 may be an example of one of the UEs 105, 106 and may comprise a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
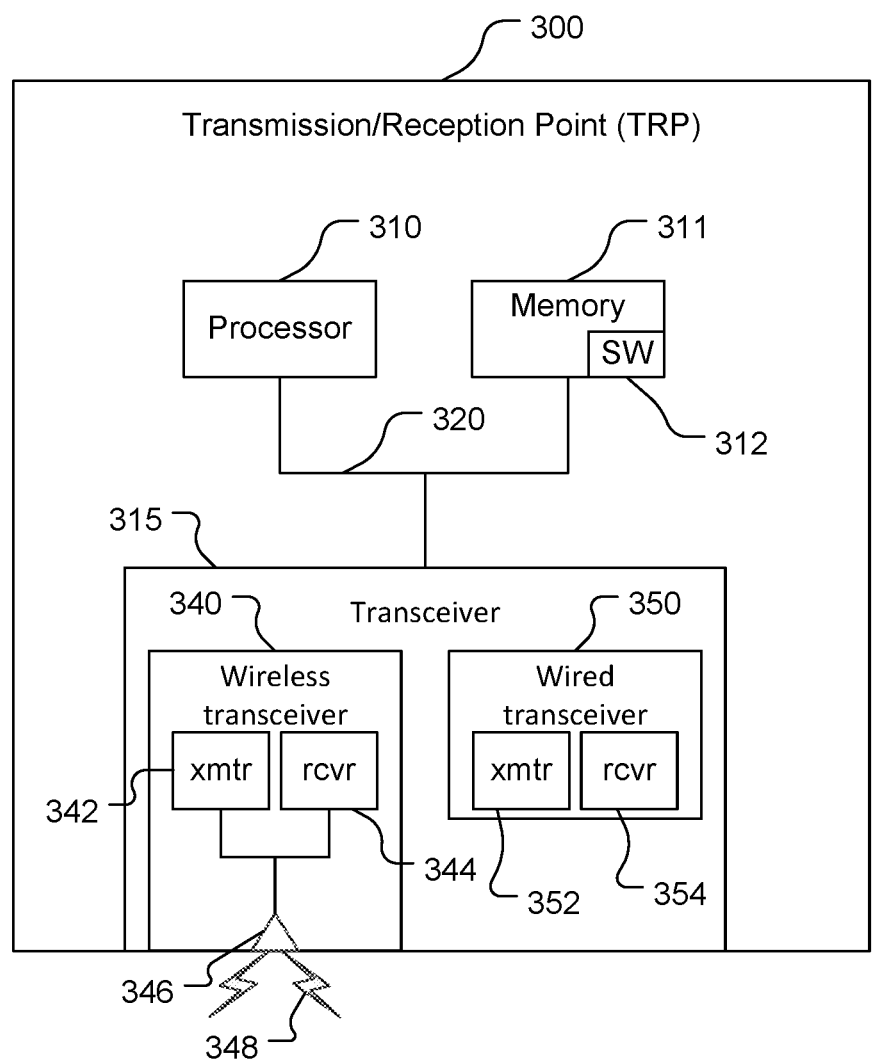
FIG. 3 is a block diagram of components of an example transmission/reception point shown in FIG. 1.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 may be a non-transitory storage medium that may include random access memory (RAM)), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by the LMF 120 and/or the UE 200 (i.e., the LMF 120 and/or the UE 200 may be configured to perform one or more of these functions).

Figure 4:
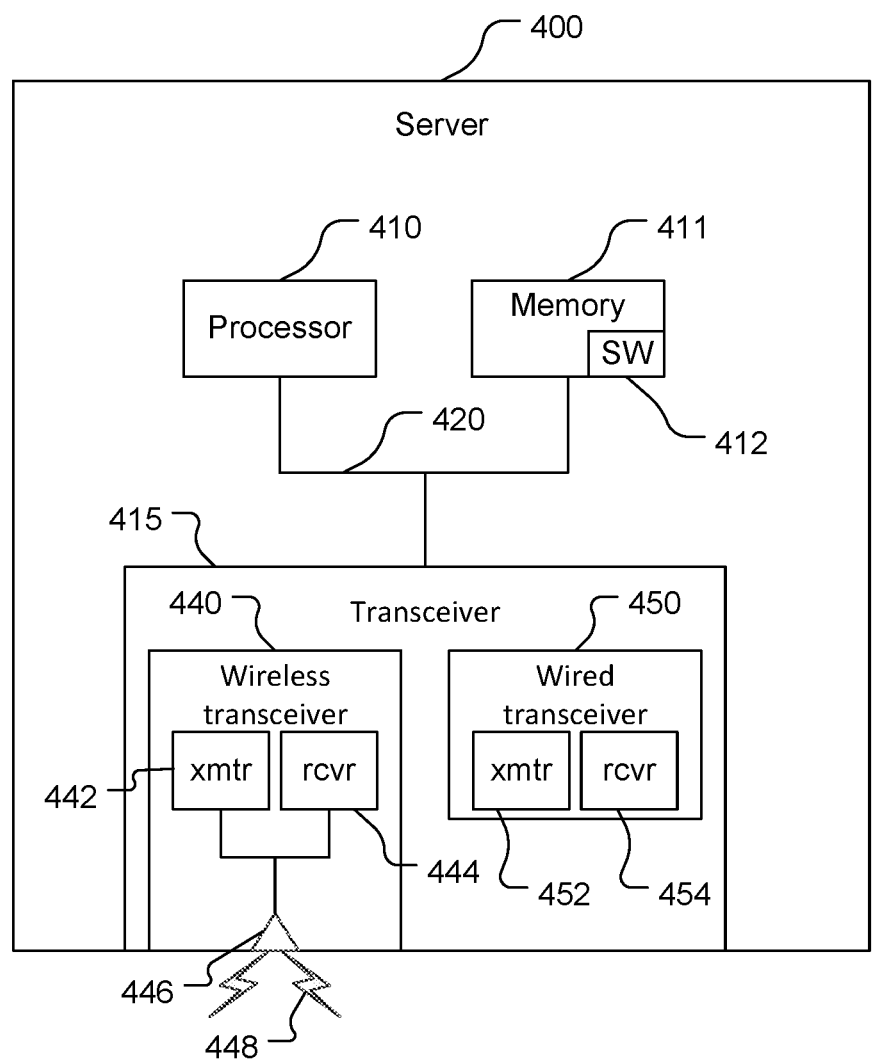
FIG. 4 is a block diagram of components of an example server shown in FIG. 1.

Referring also to FIG. 4, a server 400, of which the LMF 120 may be an example, may comprise a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 may be a non-transitory storage medium that may include random access memory (RAM)), flash memory, disc memory, and/or read-only memory (ROM), etc. The memory 411 may store the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, and subtracting the $UE_{Rx-Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Positioning and/or Sensing Behavior

Figure 5:
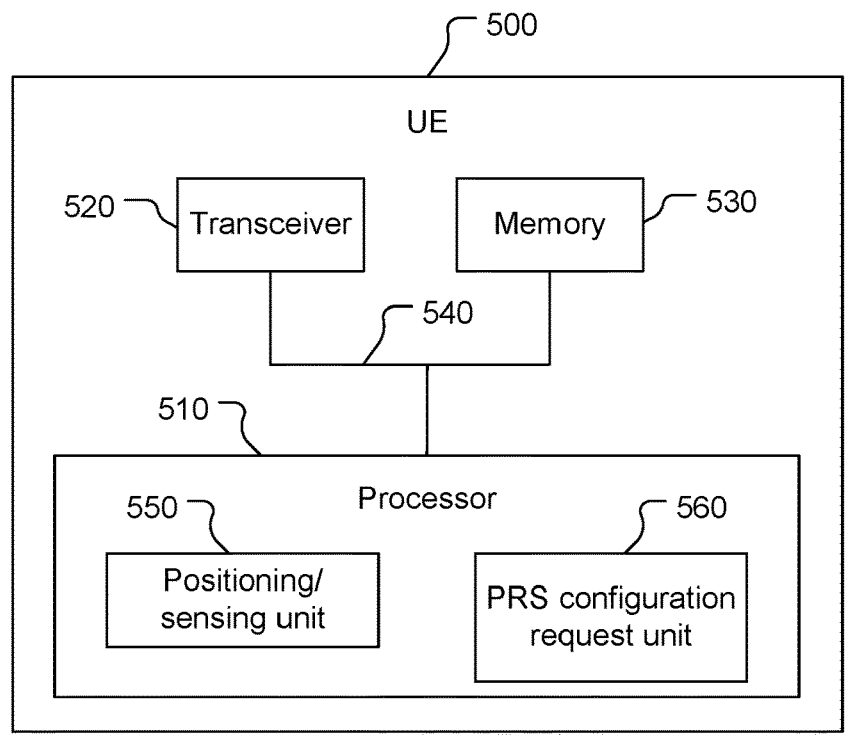
FIG. 5 is a block diagram of an example user equipment.

Referring also to FIG. 5, a UE 500 includes a processor 510, a transceiver 520, and a memory 530 communicatively coupled to each other by a bus 540. The UE 500 may include the components shown in FIG. 5. The UE 500 may include one or more other components such as any of those shown in FIG. 2 such that the UE 200 may be an example of the UE 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the transceiver 520) may include a positioning/sensing unit 550 and a PRS configuration request unit 560. The positioning/sensing unit 550 may be configured to perform positioning operations (e.g., determine position information (e.g., measurements, pseudoranges, position estimates), transmit PRS, etc.) and/or to perform sensing operations (e.g., object detection, object tracking, etc.). The positioning/sensing unit 550 and the PRS configuration request unit 560 are discussed further below, and the description may refer to the processor 510 generally, or the UE 500 generally, as performing any of the functions of the positioning/sensing unit 550 and/or the PRS configuration request unit 560, with the UE 500 being configured to perform the function(s).

Figure 6:
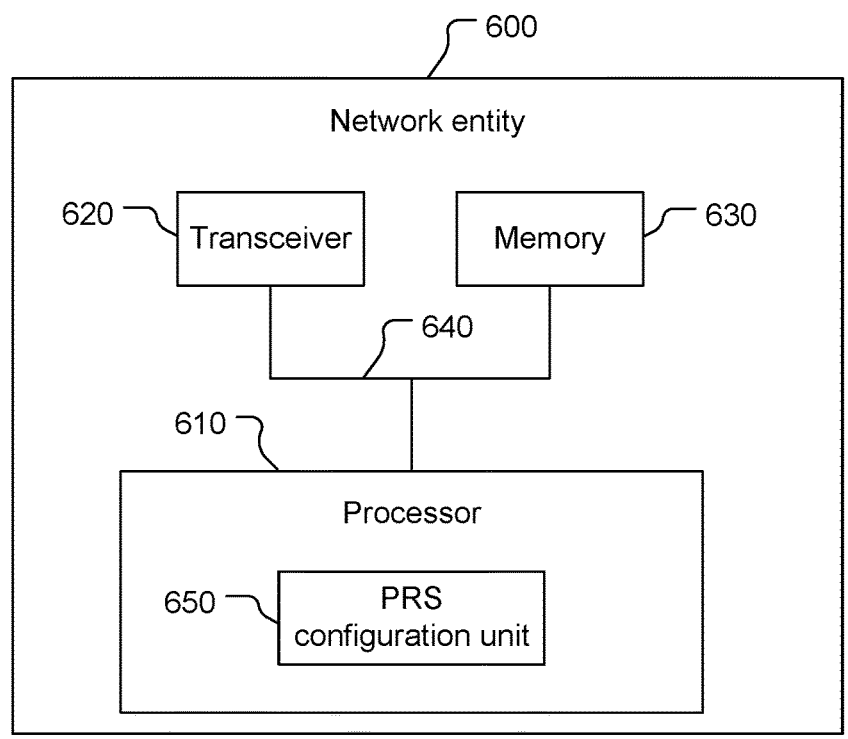
FIG. 6 is a block diagram of an example network entity.

Referring also to FIG. 6, a network entity 600 includes a processor 610, a transceiver 620, and a memory 630 communicatively coupled to each other by a bus 640. The network entity 600 may include the components shown in FIG. 6. The network entity 600 may include one or more other components such as any of those shown in FIG. 4 such that the server 400 may be an example of the network entity 600. For example, the processor 610 may include one or more of the components of the processor 410. The transceiver 620 may include one or more of the components of the transceiver 415. The memory 630 may be configured similarly to the memory 411, e.g., including software with processor-readable instructions configured to cause the processor 610 to perform functions. Also or alternatively, the network entity 600 may include one or more other components such as any of those shown in FIG. 3 such that the TRP 300 may be an example of the network entity 600. For example, the processor 610 may include one or more of the components of the processor 310. The transceiver 620 may include one or more of the components of the transceiver 315. The memory 630 may be configured similarly to the memory 311, e.g., including software with processor-readable instructions configured to cause the processor 610 to perform functions.

The description herein may refer to the processor 610 performing a function, but this includes other implementations such as where the processor 610 executes software (stored in the memory 630) and/or firmware. The description herein may refer to the server 600 performing a function as shorthand for one or more appropriate components (e.g., the processor 610 and the memory 630) of the server 600 performing the function. The processor 610 (possibly in conjunction with the memory 630 and, as appropriate, the transceiver 620) may include a PRS configuration unit 650. The PRS configuration unit 650 is discussed further below, and the description may refer to the processor 610 generally, or the server 600 generally, as performing any of the functions of the PRS configuration unit 650, with the server 600 being configured to perform the function(s).

Discontinuous reception (DRX) is a mechanism in which a UE, e.g., the UE 200, operates intermittently in a sleep mode and an active mode for communication. The UE 200 may enter the sleep mode from the active mode and stay in the sleep mode for a predetermined amount of time, although the time in the sleep mode may be altered, e.g., before entering the sleep mode or while in the sleep mode. The UE 200 may enter the sleep mode in response to a MAC-CE (Media Access Control-Control Element) or in response to expiration of a timer (e.g., a secondary cell deactivation timer, sCellDeactivationTimer). The sleep mode time may be altered dynamically or in a predetermined way (e.g., according to a schedule of different sleep times). The UE 200 may enter the active mode by waking up from the sleep mode, e.g., in response to a MAC-CE (Media Access Control-Control Element). In "normal," non-DRX operation, the UE 200 is in the active mode at all times and monitors a PDCCH (Physical Downlink Control Channel) for every subframe or slot or monitoring instance as the UE 200 is unaware of when the network will transmit data for the UE 200. This non-DRX operation may consume more power than is desired and, for example, cause the UE 200 to require charging more than desired or lack power to run one or more desired functions.

During the DRX active time (also called the DRX ON duration), the UE 200 typically monitors the PDCCH. The active time includes times that: the ON duration timer is running; the DRX inactivity timer is running; the DRX retransmission timer is running; a MAC (Media Access Control) contention resolution timer is running; a scheduling request has been sent on PUCCH (Physical Uplink Control Channel) and is pending; an uplink grant for a pending HARQ (Hybrid Automatic Repeat reQuest) retransmission may occur and there are data in a corresponding HARQ buffer; a PDCCH (communication) indicates a new transmission addressed to a C-RNTI (Cell-Radio Network Temporary Identity) of the UE 200 has not been received after successful reception of an RAR (Random Access Response) for the preamble not selected by the UE 200; and in a non-contention based RA (Routing Area), until a PDCCH indicating a new transmission to the C-RNTI of the UE 200 is received. The DRX active time may be referred to as the DRX ON time and/or a UE may be referred to as being ON even if the time is outside of a designated ON time (according to the ON duration timer), e.g., while the DRX inactivity timer is running.

If processing for a UE function extraneous to DRX operation (e.g., positioning, sensing) can be timed to coincide with one or more DRX ON durations, then processing power may be conserved, e.g., by avoiding extra wake-ups to accommodate the UE function. Aligning the non-DRX functionality may not be feasible with present configurations, e.g., that lack support for non-uniform-integer PRS repetition, reference signal occasions separated by a non-integer number of slots and/or multiple separations being separated by different times, e.g., different integer quantities of slots or different times that are unequal to an integer number of slots. While it is often desirable to transmit packets as fast as possible, if a DRX ON duration is misaligned with scheduled packet delivery, then delay may result.

Referring also to FIGS. 7-9, DRX may have non-uniform integer cycles, e.g., to accommodate various data such as XR (i.e., VR (Virtual Reality) and AR (Augmented Reality)) traffic to help expedite data transfer. A periodicity of a configured grant (CG) under current industry standards can only be an integer number of slots whereas XR frames arrive periodically every 1/F seconds, where F is the frame rate in FPS (Frames Per Second), and where typical values of F may be 30, 60, 90, or 120, resulting in non-integer periodicities of 1/30 s, 1/60 s, 1/90 s, or 1/120 s. Consequently, XR traffic may arrive in bursts that are begun a non-integer number of slots apart, e.g., bursts beginning 8.333 ms apart, with 8.333 ms corresponding to a non-integer number of slots. For example, as shown in FIG. 7, bursts 711, 712, 713, 714 of XR traffic have starting arrival times 721, 722, 723, 724 that are uniformly (consistently) separated by a cycle time 730 that does not correspond to an integer quantity of slots. Without adjusting separation times between DRX ON durations, such traffic may not arrive during a DRX ON duration. For example, ON durations 811, 812, 813, 815 are uniformly spaced by a cycle time 830 that is an integer quantity of slots, but due to the cycle time 730 not being an integer number of slots, the burst 714 arrives outside of the ON duration 814. A non-uniform integer DRX mode, however, has non-uniform integer cycles with cycles that are integer numbers of slots apart, but that have at least two different cycle times, with different pairs of cycles separated by different integer quantities of slots (e.g., a second ON duration starts M slots from a start time of a first ON duration, and a third ON duration starts N slots from the start time of the second ON duration, where M and N are integers and M≠N). For example, as shown in FIG. 8, start times of ON durations 811, 812 and start times of ON durations 812, 813 are separated by a cycle time 830, e.g., of M slots, and start times of ON durations 813, 814 are separated by a cycle time 840, e.g., of N slots, where M and N are integers and, in this case, N>M. Because the cycle time 840 is greater than the cycle time 830, the cycle time 840 may be referred to as a leap cycle. A leap cycle may be used to align a DRX ON duration with desired packet traffic, here such that the burst 714 arrives during the ON duration 814. As discussed herein, e.g., as shown in FIG. 9A or FIG. 9B, a positioning and/or sensing performance state of a UE may have non-uniform-integer cycles, e.g., such that times of performances of a positioning operation and/or a sensing operation may at least partially overlap with non-uniform integer DRX ON durations and/or non-uniform-integer traffic. As shown in FIG. 9A, start times of ON durations 911, 912 of a positioning/sensing operation state (i.e., of performance of a positioning operation and/or a sensing operation) and start times of ON durations 912, 913 of the positioning/sensing operation state are separated by a cycle time 930, and start times of ON durations 913, 914 of the positioning/sensing operation state are separated by a cycle time 940. In this example, the cycle time 930 equals the cycle time 830 and the cycle time 940 equals the cycle time 840, with the cycle time 940 providing a leap cycle, but other cycle times of ON durations of the positioning/sensing operation state may be used. For example, as shown in FIG. 9B, uniform non-integer cycles may be provided, e.g., to accommodate non-uniform-integer traffic such as XR traffic and/or to accommodate a desire for non-uniform-integer positioning/sensing activity. In FIG. 9B, start times of positioning/sensing activity durations 951, 952, 953, 954 are separated by uniform non-integer cycle times, here the cycle times 730. The cycle times 730 may be defined in terms of seconds or milliseconds (or fraction of slots) and are not equal to an integer number of slots. Positioning/sensing activity durations may be separated by non-integer cycle times and non-uniform cycle times. For example, the cycle times 930 may not be an integer number of cycles and the cycle time 940 may or may not be an integer number of cycles, such that the cycle time 940 provides a leap cycle relative to non-integer cycle times. Also, the ON durations 811-814, 911-914, and 951-954 are shown as being of equal times, but ON durations may differ, e.g., the ON durations 811-814 may not be equal to the durations of the ON durations 911-914.

Various techniques based on a UE operating with non-uniform integer DRX cycles are introduced. For example, a UE may perform one or more positioning and/or RF sensing operations using legacy positioning/sensing operation timing, or modified legacy positioning/sensing operation timing, in the presence of non-uniform integer DRX cycles, e.g., to help align (at least partially) such operation(s) with non-uniform integer DRX cycles, e.g., such that operation times may at least partially overlap with DRX ON durations. As another example, non-uniform-integer positioning/sensing operations may be configured/performed based on non-uniform integer DRX cycles, e.g., to help align (at least partially) such operation(s) with non-uniform integer DRX cycles, e.g., such that operation times may at least overlap with DRX ON durations. As another example, non-uniform-integer positioning/sensing operations may be configured/performed based on a desire for non-uniform-integer performance, e.g., to accommodate non-uniform-integer traffic or other desire (e.g., for non-uniform-integer reporting). The discussion herein focuses on the use of PRS, but other types of RS may be used.

Figure 10:
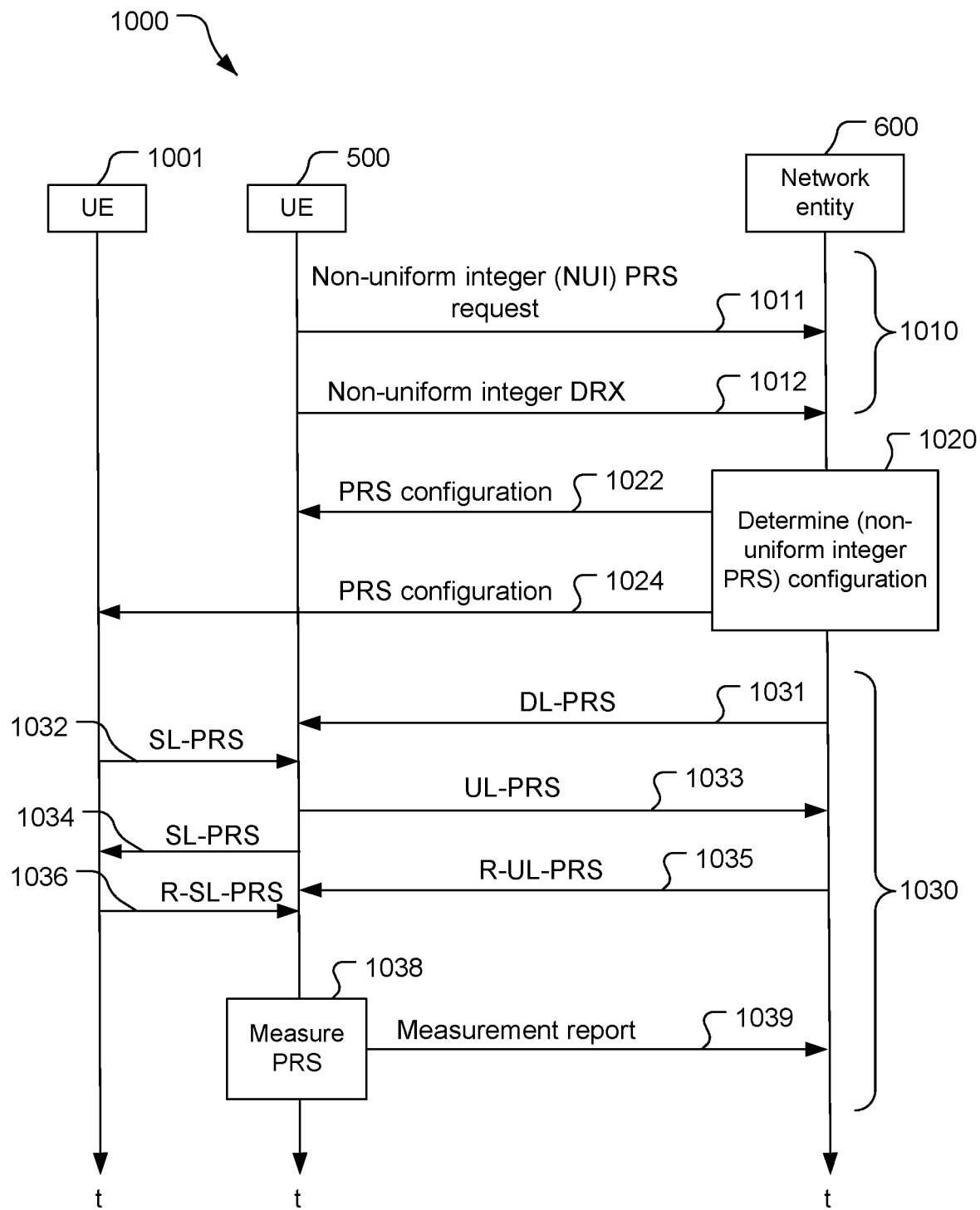
FIG. 10 is a signal and processing flow diagram for positioning and/or RF sensing.
Figure 11:
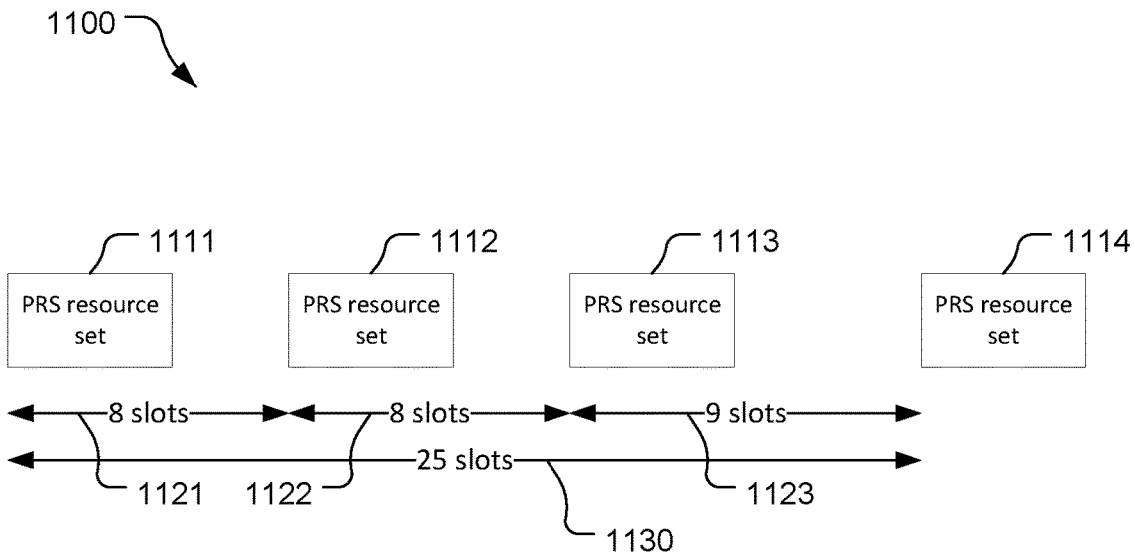
FIG. 11 is a timing diagram of reference signal resource sets with a leap cycle.
Figure 12:
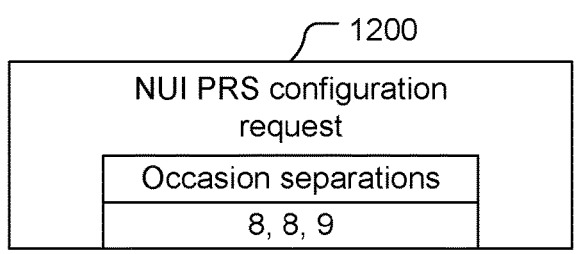
FIG. 12 is a simplified diagram of a reference signal configuration request for non-uniform occasion separations.
Figure 13:
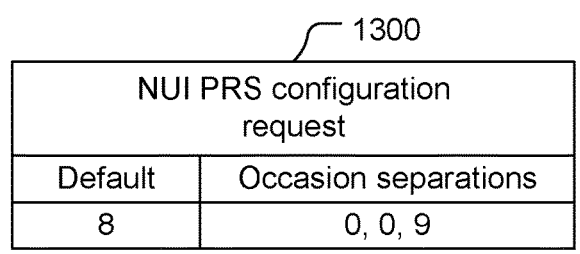
FIG. 13 is a simplified diagram of another reference signal configuration request for non-uniform occasion separations.
Figure 14:
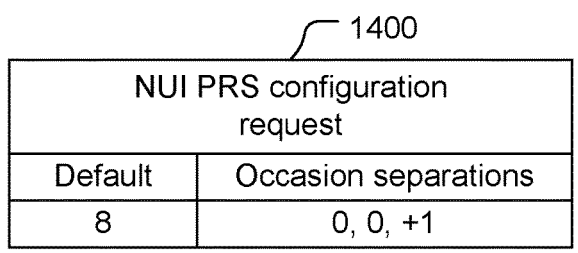
FIG. 14 is a simplified diagram of another reference signal configuration request for non-uniform occasion separations.
Figure 15:
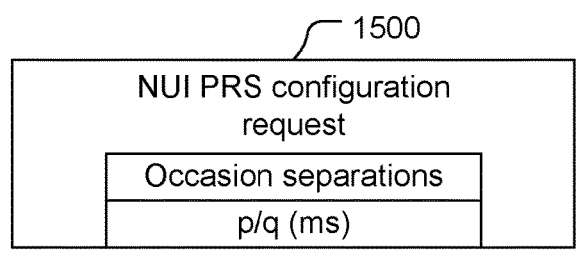
FIG. 15 is a simplified diagram of a reference signal configuration request for non-integer occasion separations.

Referring also to FIG. 10, a signal and processing flow 1000 for positioning and/or RF sensing includes stages shown. The flow 1000 is an example flow and not limiting. The flow 1000 may be altered, e.g., by having one or more messages and/or one or more stages added, removed, rearranged, combined, performed concurrently, and/or having one or more messages and/or one or more stages split into multiple messages and/or stages. For example, one or more message transfers at stage 1010 are optional, as is the stage 1010.

At stage 1010, the UE 500, e.g., the PRS configuration request unit 560, may transmit a non-uniform-integer (NUI) PRS request message 1011. The NUI PRS request message 1011 may request a configuration for an NUI PRS, e.g., PRS with non-integer periodicity and/or with non-uniform occasion spacing. For example, the UE 500 may use a dl-prs-ResourceSetPreiodicityReq information element (IE) to specify one or more non-uniform-integer repetition parameters (e.g., non-integer occasion spacing, non-uniform occasion spacing, specific spacings between PRS resource repetitions, etc.). For example, the UE 500 may request a PRS resource set (e.g., DL-PRS resource set, UL-PRS resource set, SL-PRS resource set) with a non-integer periodicity (e.g., a rational-number periodicity, e.g., as indicated by a fraction). Non-integer occasion spacing may be specified in any of a variety of terms, e.g., second, milliseconds, fractions of a second, fraction of slots (e.g., a fraction of a slot, which may be greater than 1).

Referring also to FIGS. 11-15, the UE 500, e.g., the PRS configuration request unit 560, may indicate a requested non-uniform-integer PRS configuration in one or more of a variety of ways. In this example, a requested PRS configuration indicates a sequence 1100 of PRS resource sets 1111, 1112, 1113, 1114 (e.g., four occasions of a PRS resource set). Start times of the PRS resource sets 1111, 1112 are separated by eight slots and start times of the PRS resource sets 1112, 1113 are separated by eight slots. Start times of the PRS resources sets 1113, 1114 in this example are separated by nine slots, and thus a leap cycle, relative to the separations of the resource sets 1111, 1112, 1113. The sequence 1100 may be described as including a number, N, of PRS resource set occasions and a corresponding number, N−1, of inner periods or occasion separations (i.e., separations of start times of the PRS resource set occasions). The NUI PRS request message 1011 may, for example, specify the requested PRS configuration by indicating a value in quantity of slots of each occasion separation 1121, 1122, 1123 (e.g., 8, 8, 9 as indicated by an example NUI PRS request message 1200), with the total number of occasions being implied. As another example, the NUI PRS request message 1011 may specify the requested PRS configuration by indicating a default occasion separation and indicating whether each occasion separation is the default value or another value. If another value, the NUI PRS request message 1011 may indicate the actual value of the occasion separation in quantity of slots (e.g., default is 8 slots and occasions separations are 0, 0, 9, as indicated by an example NUI PRS request message 1300, where 0 indicates the default quantity) or may indicate a differential value of the occasion separation in quantity of slots relative to the default value (e.g., default is 8 slots and occasions separations are 0, 0, +1 as indicated by an example NUI PRS request message 1400). The NUI PRS request message 1011 may indicate a starting offset in quantity of slots relative to frame 0 for the first PRS resource set 1111. An outer period 1130 of the sequence 1100 is a sum of the inner periods, here 25 slots as the inner periods contain 8 slots, 8 slots, and 9 slots, respectively. As another example, the NUI PRS request message 1011 may specify one or more cycle separations as a rational number, e.g., a fraction indicating a number of milliseconds for one or more cycle separations, e.g., a uniform cycle separation as shown in an example NUI PRS request message 1500, here indicating a rational periodicity of p/q milliseconds, with p and q being integers (where p may be greater than q).

Also at stage 1010, the UE 500 (and/or the TRP 300, e.g., of a gNB) may transmit an NUI DRX message 1012 to the network entity 600. The NUI DRX message 1012 may provide information to the network entity 600 (e.g., an LMF) as to the DRX cycles of the UE 500. The NUI DRX message 1012 may provide one or more indications DRX operation of the UE 500, e.g., cycle separations of ON durations, lengths of ON durations, lengths of OFF durations, etc.

At stage 1020, the network entity 600, e.g., the PRS configuration unit 650, may determine one or more PRS configurations. The network entity 600 may use information from the NUI PRS request message 1011 to determine one or more PRS configurations for the UE 500. The network entity 600 may determine one or more uniform-integer periodicity PRS configurations and/or one or more non-uniform-integer PRS configurations. For example, a PRS configuration may include one or more leap cycles and/or non-integer occasion separations. The network entity 600 may specify parameters of a non-uniform-integer PRS configuration similarly to one or more techniques discussed above with respect to the NUI PRS request message 1011 (e.g., with respect to FIGS. 11-15). The network entity 600 may transmit a PRS configuration message 1022 to the UE 500 with the one or more PRS configurations. The network entity 600 may transmit a PRS configuration message 1024 to a UE 1001 with one or more PRS configurations, e.g., for SL-PRS transfer (e.g., SL-PRS reception from the UE 500 and/or for SL-PRS transmission to the UE 500). The network entity 600 that transmits the PRS configuration message(s) 1022, 1024 may be, for example, the TRP 300, a gNB, an LMF, and/or a sensing management function (responsible for RF sensing session in a core network, e.g., the 5G core network 140).

At stage 1030, the UE 500 may perform one or more positioning operations and/or one or more sensing operations based on the UE 500, e.g., the processor 510, operating in a non-uniform integer DRX mode. For example, the network entity 600 may transmit DL-PRS 1031 to the UE 500 and/or the UE 1001 may transmit SL-PRS 1032 to the UE 500. Also or alternatively, the UE 500 (e.g., the positioning sensing unit 550) may transmit UL-PRS 1036 to the network entity 600 and/or may transmit SL-PRS 1038 to the UE 1001. If the UE 500 transmits the UL-PRS 1033 and/or the SL-PRS 1034, the UE 500 may receive R-UL-PRS 1035 (reflected UL-PRS) and/or R-SL-PRS 1036 (reflected SL-PRS) reflected by the network entity 600 and/or the UE 1001, respectively, and/or reflected by one or more other objects. The UE 500 (e.g., the positioning/sensing unit 550) may, at sub-stage 1038, measure PRS (e.g., the DL-PRS 1031, the SL-PRS 1032, the R-UL-PRS 1035, and/or the R-SL-PRS 1036 as appropriate) for one or more positioning and/or sensing purposes. The UE 500, e.g., the positioning/sensing unit 550, may transmit a measurement report 1039 to the network entity 600 with the result(s) of one or more measurements performed by the UE 500, e.g., position information (e.g., measurement(s), pseudorange(s), position estimate(s)) and/or sensing information (e.g., object location, object detection information, object tracking information, etc.).

The positioning/sensing behavior (e.g., performance of one or more positioning operations and/or one or more sensing operations) of the UE 500 may be based on a non-uniform integer DRX mode of the UE 500 and independent of behavior (e.g., communication behavior) of the UE 500 with respect to non-uniform integer DRX cycles. For example, with the UE 500 in a non-uniform integer DRX mode, the UE 500 may perform one or more positioning and/or sensing transmission operations (e.g., transmitting the UL-PRS 1033 and/or the SL-PRS 1034) and/or one or more positioning and/or sensing measurement operations (e.g., measuring the DL-PRS 1031 and/or the SL-PRS 1032 and/or the R-UL-PRS 1035 and/or the R-SL-PRS 1036) and/or one or more positioning and/or sensing reporting operations (e.g., transmitting the measurement report 1039) regardless of whether the operation(s) fall within one or more ON durations of a non-uniform integer DRX mode of the UE 500.

The positioning/sensing behavior of the UE 500 may be based on a non-uniform integer DRX mode of the UE 500 and granular to (e.g., dependent on) a type of operation to be performed. For example, with the UE 500 in a non-uniform integer DRX mode, the UE 500 may perform one or more aperiodic operations regardless of whether the operation(s) fall within one or more ON durations of a non-uniform integer DRX mode of the UE 500. As another example, with the UE 500 in a non-uniform integer DRX mode, the UE 500 may perform one or more semi-persistent (triggered periodic) positioning and/or sensing operations and/or one or more periodic positioning and/or sensing operations dependent on the non-uniform integer DRX cycles, e.g., dependent on one or more ON durations of the non-uniform integer DRX mode. For example, the UE 500 may perform a positioning and/or sensing operation based on (e.g., if and only if) a time for performing the operation at least partially overlaps with a DRX ON duration, e.g., fully overlaps with a DRX ON duration. This may help reduce power consumption, e.g., by avoiding waking up for positioning/sensing outside of scheduled communication ON durations. As another example, the UE 500 may perform a semi-persistent or periodic positioning and/or sensing operation based on reception or non-reception of a WUS (Wake-UP Signal). A WUS, e.g., a WUS 820 (see FIG. 8), may be transmitted to the UE 500 preceding an ON duration of the non-uniform integer DRX cycles. The WUS may indicate to perform one or more one or more semi-persistent positioning and/or sensing operations and/or one or more periodic positioning and/or sensing operations, and the UE 500 may perform such operation(s) during a non-uniform integer DRX mode based on (e.g., if and only if) instructed to do so by a WUS. This may help reduce power consumption, e.g., by avoiding waking up for positioning/sensing outside of communication ON durations for which the UE 500 is instructed by the WUS is instructed to wake up. Rules governing UE behavior for positioning and/or sensing during regular (i.e., uniform, integer DRX cycles) may be used during a non-uniform integer DRX mode. The WUS may provide one or more instructions and/or one or more rules for UE behavior dependent on a corresponding operation, e.g., based on DL-PRS reception, based on UL-PRS transmission, based on DL-PRS measurement reporting, etc. For example, the WUS may indicate, separately from an indication whether to wake up for PDCCH monitoring, for the UE 500 to wake up, or not, for a particular positioning operation or sensing operation. Absent reception of a WUS, or at least a WUS providing instruction(s) or rule(s) for the UE 500 regarding positioning and/or sensing operation, the UE 500 may perform positioning and/or sensing in accordance with default behavior (e.g., default rules).

Figure 16:
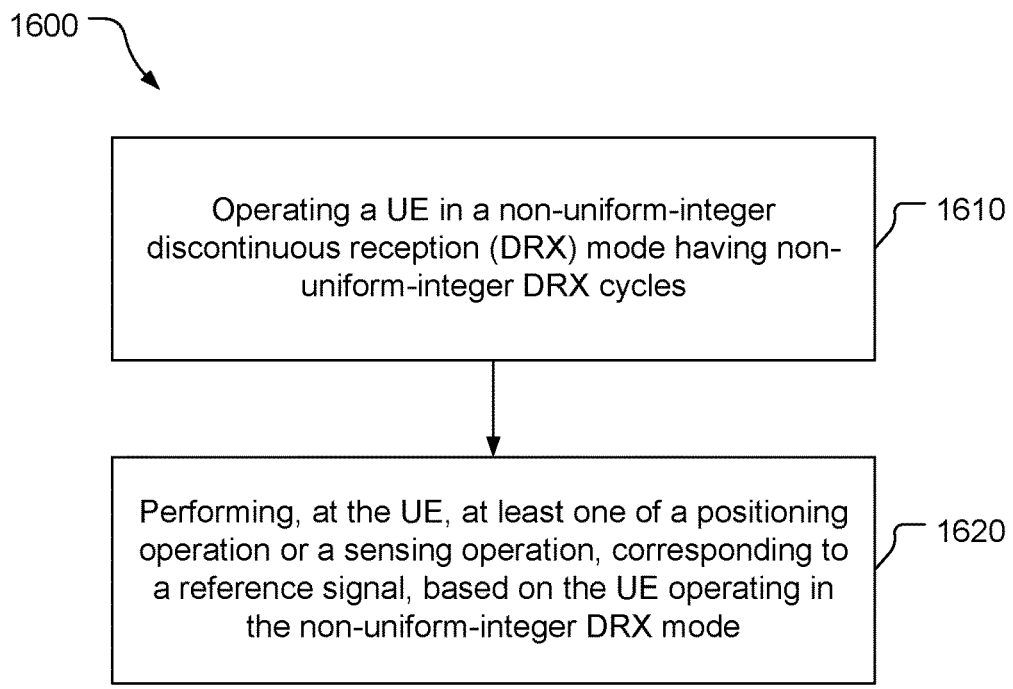
FIG. 16 is a block flow diagram of a method for at least one of positioning or sensing.

Referring to FIG. 16, with further reference to FIGS. 1-15, a method 1600 for at least one of positioning or sensing (positioning and/or sensing) includes the stages shown. The method 1600 is, however, an example only and not limiting. The method 1600 may be altered, e.g., by having one or more stages added, removed, rearranged, combined, performed concurrently, and/or having one or more single stages split into multiple stages.

At stage 1610, the method 1600 includes operating a UE in a non-uniform integer discontinuous reception (DRX) mode having non-uniform integer DRX cycles. For example, the UE 500 may operate in an NUI DRX mode with non-integer cycle spacings and/or non-uniform cycle spacings. The processor 510, possibly in combination with the memory 530, in combination with the transceiver 520 (e.g., the wireless receiver 244 and the antenna 246) may comprise means for operating in an NUI DRX mode.

At stage 1620, the method 1600 includes performing, at the UE, at least one of a positioning operation or a sensing operation, corresponding to a reference signal, based on the UE operating in the non-uniform integer DRX mode. For example, the UE 500 may transmit one or more RS, may measure one or more RS, and/or may report one or more RS measurement results at stage 1030 of the flow 1000. The processor 510, possibly in combination with the memory 530, in combination with the transceiver 520 (e.g., the wireless receiver 244 and the antenna 246, and/or the wireless transmitter 242 and the antenna 246) may comprise means for performing the at least one of the positioning operation or the sensing operation.

Implementations of the method 1600 may include one or more of the following features. In an example implementation, the at least one of the positioning operation or the sensing operation is performed regardless of a timing of one or more ON durations of the non-uniform integer DRX mode. For example, the UE 500 may perform a positioning or sensing operation regardless of timing of the operation to timing of a DRX ON duration, e.g., regardless of whether the positioning operation or sensing operation is a periodic operation, a semi-persistent operation, or an aperiodic operation. In a further example implementation, the at least one of the positioning operation or the sensing operation is performed, regardless of the timing of the one or more ON durations of the non-uniform integer DRX mode, based on the at least one of the positioning operation or the sensing operation being an aperiodic operation.

Also or alternatively, implementations of the method 1600 may include one or more of the following features. In an example implementation, the at least one of the positioning operation or the sensing operation is performed, in response to the at least one of the positioning operation or the sensing operation being a semi-persistent operation or a periodic operation, only if the at least one of the positioning operation or the sensing operation at least partially overlaps in time with an ON duration of the non-uniform integer DRX mode. For example, the UE 500 may only perform a periodic or semi-persistent positioning or sensing operation if the expected time for performing the operation at least partially overlaps with an ON duration of the DRX mode. In another example implementation, the at least one of the positioning operation or the sensing operation is performed, in response to the at least one of the positioning operation or the sensing operation being a semi-persistent operation or a periodic operation, based on whether a wake-up signal is received by the UE from a network entity. For example, the UE 500 may perform a periodic or semi-persistent positioning or sensing operation based on whether a WUS is received and if so, contents of the WUS (e.g., whether the WUS includes one or more rules and/or one or more instructions for performing a positioning or sensing operation). In a further example implementation, the at least one of the positioning operation or the sensing operation is performed in accordance with one or more indications received in the wake-up signal. In another further example implementation, the at least one of the positioning operation or the sensing operation is performed in accordance with one or more default rules absent reception of the wake-up signal from the network entity and the wake-up signal indicating how to perform the at least one of the positioning operation or the sensing operation. For example, the UE 500 may perform a positioning operation or a sensing operation in accordance with a default process if a WUS is not received or if a received WUS does not include a rule or instruction for performing the operation, or at least does not include a rule or instruction contradicting the default process.

Also or alternatively, implementations of the method 1600 may include one or more of the following features. In an example implementation, the method 1600 further includes transmitting, from the UE to a network entity, a request for a reference signal configuration for the reference signal with at least one non-uniform-integer spacing between consecutive transmissions of the reference signal. For example, at stage 1010 the UE 500 may transmit the NUI PRS request 1011 for an RS configuration with at least one non-uniform-integer transmission separation between start times of consecutive RS transmissions, e.g., the occasion separations 1121-1123. For example, the request 1011 may comprise any of the NUI PRS configuration requests 1200, 1300, 1400, 1500. In a further example implementation, the request indicates at least two separation values corresponding to the plurality of consecutive transmission pairs of at least three transmissions of the reference signal, each of the at least two separation values indicating an integer number of slots, with the at least two separation values indicating at least two different integer numbers of slots. For example, the request 1011 may comprise any of the NUI PRS configuration requests 1200, 1300, 1400. In a further example implementation, the request indicates a default number of slots for a default separation corresponding to the plurality of consecutive transmission pairs of the at least three transmissions of the reference signal, and wherein each of the at least two separation values comprises a default indication, indicating to use the default number of slots, or an indication of a specified number of slots, wherein the indication of the specified number of slots is an integer equal to the specified number of slots or an integer difference relative to the default number of slots. For example, the request 1011 may comprise either of the NUI PRS configuration requests 1300, 1400.

Figure 17:
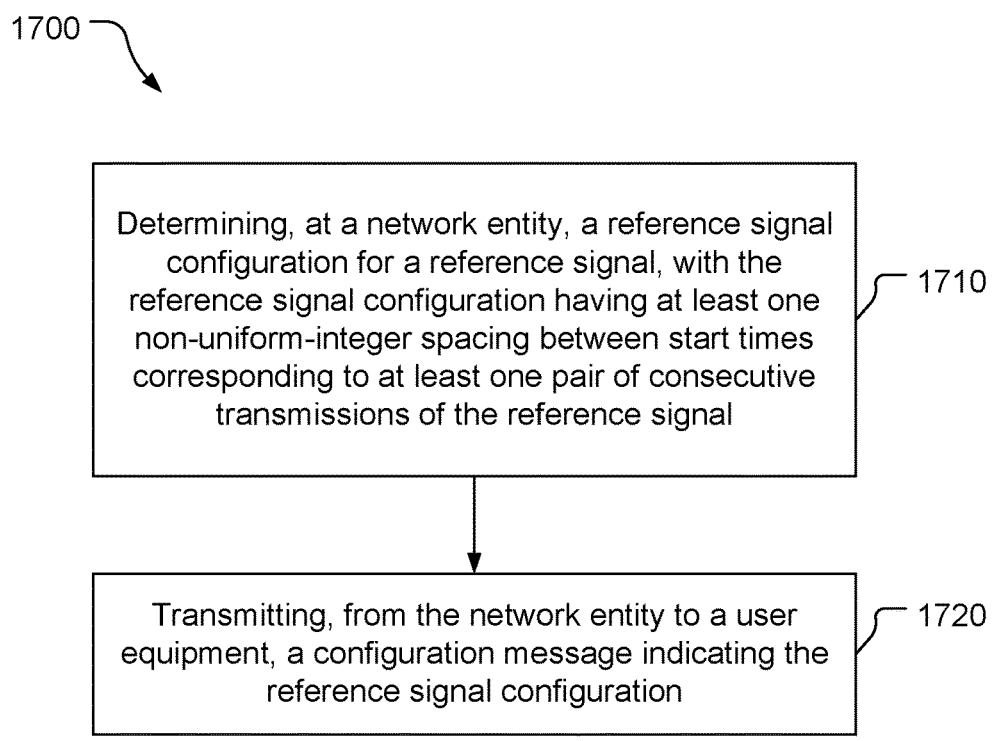
FIG. 17 is a block flow diagram of a reference signal configuration method.

Referring to FIG. 17, with further reference to FIGS. 1-15, a reference signal configuration method 1700 includes the stages shown. The method 1700 is, however, an example only and not limiting. The method 1700 may be altered, e.g., by having one or more stages added, removed, rearranged, combined, performed concurrently, and/or having one or more single stages split into multiple stages.

At stage 1710, the method 1700 includes determining, at a network entity, a reference signal configuration for a reference signal, with the reference signal configuration having at least one non-uniform-integer spacing between start times corresponding to at least one pair of consecutive transmissions of the reference signal. For example, at stage 1020 the network entity 600 may determine an NUI RS configuration having at least one non-integer occasion separation and/or at least two occasion separations of different integer values. The network entity 600 may determine the configuration based on the NUI PRS request message 1011 received from the UE 500. The processor 610, possibly in combination with the memory 630, possibly in combination with the transceiver 620 (e.g., the wireless receiver 344 and the antenna 346, or the wireless receiver 444 and the antenna 446, and/or the wired receiver 454) may comprise means for determining the reference signal configuration.

At stage 1720, the method 1700 includes transmitting, from the network entity to a user equipment, a configuration message indicating the reference signal configuration. For example, the network entity 600 may transmit the PRS configuration message 1022 to the UE 500 and/or the PRS configuration message 1024 to the UE 1001. The processor 610, possibly in combination with the memory 630, in combination with the transceiver 620 (e.g., the wireless transmitter 342 and the antenna 346, or the wireless transmitter 442 and the antenna 446, and/or the wired transmitter 452) may comprise means for transmitting the configuration message.

Implementations of the method 1700 may include one or more of the following features. In an example implementation, the configuration message indicates at least two separation values corresponding to different pairs of consecutive transmissions of the reference signal, each of the at least two separation values indicating an integer number of slots, with the at least two separation values indicating at least two different integer numbers of slots. For example, the configuration message may include information similar to any of the NUI PRS configuration requests 1200, 1300, 1400. In a further example implementation, the configuration message indicates a default number of slots for a default separation corresponding to the different pairs of consecutive transmissions of the reference signal, and wherein each of the at least two separation values comprises a default indication, indicating to use the default number of slots, or an indication of a specified number of slots, wherein the indication of the specified number of slots is an integer equal to the specified number of slots or an integer difference relative to the default number of slots. For example, the configuration message may include information similar to either of the NUI PRS configuration requests 1300, 1400. In another example implementation, the configuration message indicates a rational, non-integer number. For example, the configuration message may include information similar to the NUI PRS configuration request 1500.

Implementation Examples

Implementation examples are provided in the following numbered clauses.

Clause 1. A user equipment (UE) comprising:
a memory;
a transceiver; and
a processor, communicatively coupled to the memory and the transceiver, configured to:
operate in a non-uniform integer discontinuous reception (DRX) mode having non-uniform integer DRX cycles; and
perform at least one of a positioning operation or a sensing operation, corresponding to a reference signal, based on the processor operating in the non-uniform integer DRX mode.

Clause 2. The UE of clause 1, wherein the processor is configured to perform the at least one of the positioning operation or the sensing operation regardless of a timing of one or more ON durations of the non-uniform integer DRX mode.

Clause 3. The UE of clause 2, wherein the processor is configured to perform the at least one of the positioning operation or the sensing operation, regardless of the timing of the one or more ON durations of the non-uniform integer DRX mode, based on the at least one of the positioning operation or the sensing operation being an aperiodic operation.

Clause 4. The UE of clause 1, wherein the processor is configured to respond to the at least one of the positioning operation or the sensing operation being a semi-persistent operation or a periodic operation by performing the at least one of the positioning operation or the sensing operation at least partially overlapping in time with an ON duration of the non-uniform integer DRX mode.

Clause 5. The UE of clause 1, wherein the processor is configured to respond to the at least one of the positioning operation or the sensing operation being a semi-persistent operation or a periodic operation by performing the at least one of the positioning operation or the sensing operation based on whether a wake-up signal is received by the processor from the transceiver.

Clause 6. The UE of clause 5, wherein the processor is configured to respond to the at least one of the positioning operation or the sensing operation being a semi-persistent operation or a periodic operation by performing the at least one of the positioning operation or the sensing operation in accordance with one or more indications received from the transceiver in the wake-up signal.

Clause 7. The UE of clause 5, wherein the processor is configured to respond to the at least one of the positioning operation or the sensing operation being a semi-persistent operation or a periodic operation by performing the at least one of the positioning operation or the sensing operation in accordance with one or more default rules absent reception of the wake-up signal from the transceiver and the wake-up signal indicating how to perform the at least one of the positioning operation or the sensing operation.

Clause 8. The UE of clause 1, wherein the processor is configured to transmit, via the transceiver, a request for a reference signal configuration for the reference signal with at least one non-uniform-integer spacing between consecutive transmissions of the reference signal.

Clause 9. The UE of clause 8, wherein the request indicates at least two separation values corresponding to the plurality of consecutive transmission pairs of at least three transmissions of the reference signal, each of the at least two separation values indicating an integer number of slots, with the at least two separation values indicating at least two different integer numbers of slots.

Clause 10. The UE of clause 9, wherein the request indicates a default number of slots for a default separation corresponding to the plurality of consecutive transmission pairs of the at least three transmissions of the reference signal, and wherein each of the at least two separation values comprises a default indication, indicating to use the default number of slots, or an indication of a specified number of slots, wherein the indication of the specified number of slots is an integer equal to the specified number of slots or an integer difference relative to the default number of slots.

Clause 11. The UE of clause 8, wherein the request indicates a rational number for the at least one non-uniform spacing.

Clause 12. A method, for at least one of positioning or sensing, comprising:
operating a user equipment (UE) in a non-uniform integer discontinuous reception (DRX) mode having non-uniform integer DRX cycles; and
performing, at the UE, at least one of a positioning operation or a sensing operation, corresponding to a reference signal, based on the UE operating in the non-uniform integer DRX mode.

Clause 13. The method of clause 12, wherein the at least one of the positioning operation or the sensing operation is performed regardless of a timing of one or more ON durations of the non-uniform integer DRX mode.

Clause 14. The method of clause 13, wherein the at least one of the positioning operation or the sensing operation is performed, regardless of the timing of the one or more ON durations of the non-uniform integer DRX mode, based on the at least one of the positioning operation or the sensing operation being an aperiodic operation.

Clause 15. The method of clause 12, wherein the at least one of the positioning operation or the sensing operation is performed, in response to the at least one of the positioning operation or the sensing operation being a semi-persistent operation or a periodic operation, only if the at least one of the positioning operation or the sensing operation at least partially overlaps in time with an ON duration of the non-uniform integer DRX mode.

Clause 16. The method of clause 12, wherein the at least one of the positioning operation or the sensing operation is performed, in response to the at least one of the positioning operation or the sensing operation being a semi-persistent operation or a periodic operation, based on whether a wake-up signal is received by the
UE from a network entity.

Clause 17. The method of clause 16, wherein the at least one of the positioning operation or the sensing operation is performed in accordance with one or more indications received in the wake-up signal.

Clause 18. The method of clause 16, wherein the at least one of the positioning operation or the sensing operation is performed in accordance with one or more default rules absent reception of the wake-up signal from the network entity and the wake-up signal indicating how to perform the at least one of the positioning operation or the sensing operation.

Clause 19. The method of clause 12, further comprising transmitting, from the
UE to a network entity, a request for a reference signal configuration for the reference signal with at least one non-uniform-integer spacing between consecutive transmissions of the reference signal.

Clause 20. The method of clause 19, wherein the request indicates at least two separation values corresponding to the plurality of consecutive transmission pairs of at least three transmissions of the reference signal, each of the at least two separation values indicating an integer number of slots, with the at least two separation values indicating at least two different integer numbers of slots.

Clause 21. The method of clause 20, wherein the request indicates a default number of slots for a default separation corresponding to the plurality of consecutive transmission pairs of the at least three transmissions of the reference signal, and wherein each of the at least two separation values comprises a default indication, indicating to use the default number of slots, or an indication of a specified number of slots, wherein the indication of the specified number of slots is an integer equal to the specified number of slots or an integer difference relative to the default number of slots.

Clause 22. The method of clause 19, wherein the request indicates a rational number for the at least one non-uniform spacing.

Clause 23. A user equipment (UE) comprising:
- means for operating in a non-uniform integer discontinuous reception (DRX) mode having non-uniform integer DRX cycles; and
- means for performing at least one of a positioning operation or a sensing operation, corresponding to a reference signal, based on the UE operating in the non-uniform integer DRX mode.

Clause 24. The UE of clause 23, wherein the means for performing the at least one of the positioning operation or the sensing operation comprise means for performing the at least one of the positioning operation or the sensing operation regardless of a timing of one or more ON durations of the non-uniform integer DRX mode.

Clause 25. The UE of clause 24, wherein the means for performing the at least one of the positioning operation or the sensing operation comprise means for performing the at least one of the positioning operation or the sensing operation, regardless of the timing of the one or more ON durations of the non-uniform integer DRX mode, based on the at least one of the positioning operation or the sensing operation being an aperiodic operation.

Clause 26. The UE of clause 23, wherein the means for performing the at least one of the positioning operation or the sensing operation comprise means for performing the at least one of the positioning operation or the sensing operation, in response to the at least one of the positioning operation or the sensing operation being a semi-persistent operation or a periodic operation, only if the at least one of the positioning operation or the sensing operation at least partially overlaps in time with an ON duration of the non-uniform integer DRX mode.

Clause 27. The UE of clause 23, wherein the means for performing the at least one of the positioning operation or the sensing operation comprise means for performing the at least one of the positioning operation or the sensing operation, in response to the at least one of the positioning operation or the sensing operation being a semi-persistent operation or a periodic operation, based on whether a wake-up signal is received by the UE from a network entity.

Clause 28. The UE of clause 27, wherein the means for performing the at least one of the positioning operation or the sensing operation comprise means for performing the at least one of the positioning operation or the sensing operation in accordance with one or more indications received in the wake-up signal.

Clause 29. The UE of clause 27, wherein the means for performing the at least one of the positioning operation or the sensing operation comprise means for performing the at least one of the positioning operation or the sensing operation in accordance with one or more default rules absent reception of the wake-up signal from the network entity and the wake-up signal indicating how to perform the at least one of the positioning operation or the sensing operation.

Clause 30. The UE of clause 23, further comprising means for transmitting, from the UE to a network entity, a request for a reference signal configuration for the reference signal with at least one non-uniform-integer spacing between consecutive transmissions of the reference signal.

Clause 31. The UE of clause 30, wherein the request indicates at least two separation values corresponding to the plurality of consecutive transmission pairs of at least three transmissions of the reference signal, each of the at least two separation values indicating an integer number of slots, with the at least two separation values indicating at least two different integer numbers of slots.

Clause 32. The UE of clause 31, wherein the request indicates a default number of slots for a default separation corresponding to the plurality of consecutive transmission pairs of the at least three transmissions of the reference signal, and wherein each of the at least two separation values comprises a default indication, indicating to use the default number of slots, or an indication of a specified number of slots, wherein the indication of the specified number of slots is an integer equal to the specified number of slots or an integer difference relative to the default number of slots.

Clause 33. The UE of clause 30, wherein the request indicates a rational number for the at least one non-uniform spacing.

Clause 34. A non-transitory, processor-readable storage medium comprising processor-readable instructions to cause a processor of a user equipment (UE) to:
- operate in a non-uniform integer discontinuous reception (DRX) mode having non-uniform integer DRX cycles; and
- perform at least one of a positioning operation or a sensing operation, corresponding to a reference signal, based on the UE operating in the non-uniform integer DRX mode.

Clause 35. The non-transitory, processor-readable storage medium of clause 34, wherein the processor-readable instructions to cause the processor to perform the at least one of a positioning operation or a sensing operation comprise processor-readable instructions to cause the processor to perform the at least one of the positioning operation or the sensing operation regardless of a timing of one or more ON durations of the non-uniform integer DRX mode.

Clause 36. The non-transitory, processor-readable storage medium of clause 35, wherein the processor-readable instructions to cause the processor to perform the at least one of the positioning operation or the sensing operation comprise processor-readable instructions to cause the processor to perform the at least one of the positioning operation or the sensing operation, regardless of the timing of the one or more ON durations of the non-uniform integer DRX mode, based on the at least one of the positioning operation or the sensing operation being an aperiodic operation.

Clause 37. The non-transitory, processor-readable storage medium of clause 34, wherein the processor-readable instructions to cause the processor to perform the at least one of the positioning operation or the sensing operation comprise processor-readable instructions to cause the processor to perform the at least one of the positioning operation or the sensing operation, in response to the at least one of the positioning operation or the sensing operation being a semi-persistent operation or a periodic operation, only if the at least one of the positioning operation or the sensing operation at least partially overlaps in time with an ON duration of the non-uniform integer DRX mode.

Clause 38. The non-transitory, processor-readable storage medium of clause 34, wherein the processor-readable instructions to cause the processor to perform the at least one of the positioning operation or the sensing operation comprise processor-readable instructions to cause the processor to perform the at least one of the positioning operation or the sensing operation, in response to the at least one of the positioning operation or the sensing operation being a semi-persistent operation or a periodic operation, based on whether a wake-up signal is received by the UE from a network entity.

Clause 39. The non-transitory, processor-readable storage medium of clause 38, wherein the processor-readable instructions to cause the processor to perform the at least one of the positioning operation or the sensing operation comprise processor-readable instructions to cause the processor to perform the at least one of the positioning operation or the sensing operation in accordance with one or more indications received in the wake-up signal.

Clause 40. The non-transitory, processor-readable storage medium of clause 38, wherein the processor-readable instructions to cause the processor to perform the at least one of the positioning operation or the sensing operation comprise processor-readable instructions to cause the processor to perform the at least one of the positioning operation or the sensing operation in accordance with one or more default rules absent reception of the wake-up signal from the network entity and the wake-up signal indicating how to perform the at least one of the positioning operation or the sensing operation.

Clause 41. The non-transitory, processor-readable storage medium of clause 34, further comprising processor-readable instructions to cause the processor to transmit, from the UE to a network entity, a request for a reference signal configuration for the reference signal with at least one non-uniform-integer spacing between consecutive transmissions of the reference signal.

Clause 42. The non-transitory, processor-readable storage medium of clause 41, wherein the request indicates at least two separation values corresponding to the plurality of consecutive transmission pairs of at least three transmissions of the reference signal, each of the at least two separation values indicating an integer number of slots, with the at least two separation values indicating at least two different integer numbers of slots.

Clause 43. The non-transitory, processor-readable storage medium of clause 42, wherein the request indicates a default number of slots for a default separation corresponding to the plurality of consecutive transmission pairs of the at least three transmissions of the reference signal, and wherein each of the at least two separation values comprises a default indication, indicating to use the default number of slots, or an indication of a specified number of slots, wherein the indication of the specified number of slots is an integer equal to the specified number of slots or an integer difference relative to the default number of slots.

Clause 44. The non-transitory, processor-readable storage medium of clause 41, wherein the request indicates a rational number for the at least one non-uniform spacing.

Clause 45. A network entity comprising:
a memory;
a transceiver; and
a processor, communicatively coupled to the memory and the transceiver, configured to:
 determine a reference signal configuration for a reference signal, with the reference signal configuration having at least one non-uniform-integer spacing between start times corresponding to at least one pair of consecutive transmissions of the reference signal; and
 transmit, via the transceiver to a user equipment, a configuration message indicating the reference signal configuration.

Clause 46. The network entity of clause 45, wherein the configuration message indicates at least two separation values corresponding to different pairs of consecutive transmissions of the reference signal, each of the at least two separation values indicating an integer number of slots, with the at least two separation values indicating at least two different integer numbers of slots.

Clause 47. The network entity of clause 46, wherein the configuration message indicates a default number of slots for a default separation corresponding to the different pairs of consecutive transmissions of the reference signal, and wherein each of the at least two separation values comprises a default indication, indicating to use the default number of slots, or an indication of a specified number of slots, wherein the indication of the specified number of slots is an integer equal to the specified number of slots or an integer difference relative to the default number of slots.

Clause 48. The network entity of clause 45, wherein the configuration message indicates a rational, non-integer number.

Clause 49. A reference signal configuration method comprising:
determining, at a network entity, a reference signal configuration for of a reference signal, with the reference signal configuration having at least one non-uniform-integer spacing between start times corresponding to at least one pair of consecutive transmissions of the reference signal; and
transmitting, from the network entity to a user equipment, a configuration message indicating the reference signal configuration.

Clause 50. The reference signal configuration method of clause 49, wherein the configuration message indicates at least two separation values corresponding to different pairs of consecutive transmissions of the reference signal, each of the at least two separation values indicating an integer number of slots, with the at least two separation values indicating at least two different integer numbers of slots.

Clause 51. The reference signal configuration method of clause 50, wherein the configuration message indicates a default number of slots for a default separation corresponding to the different pairs of consecutive transmissions of the reference signal, and wherein each of the at least two separation values comprises a default indication, indicating to use the default number of slots, or an indication of a specified number of slots, wherein the indication of the specified number of slots is an integer equal to the specified number of slots or an integer difference relative to the default number of slots.

Clause 52. The reference signal configuration method of clause 49, wherein the configuration message indicates a rational, non-integer number.

Clause 53. A network entity comprising:
means for determining a reference signal configuration for of a reference signal, with the reference signal configuration having at least one non-uniform-integer spacing between start times corresponding to at least one pair of consecutive transmissions of the reference signal; and
means for transmitting, from the network entity to a user equipment, a configuration message indicating the reference signal configuration.

Clause 54. The network entity of clause 53, wherein the configuration message indicates at least two separation values corresponding to different pairs of consecutive transmissions of the reference signal, each of the at least two separation values indicating an integer number of slots, with the at least two separation values indicating at least two different integer numbers of slots.

Clause 55. The network entity of clause 54, wherein the configuration message indicates a default number of slots for a default separation corresponding to the different pairs of consecutive transmissions of the reference signal, and wherein each of the at least two separation values comprises a default indication, indicating to use the default number of slots, or an indication of a specified number of slots, wherein the indication of the specified number of slots is an integer equal to the specified number of slots or an integer difference relative to the default number of slots.

Clause 56. The network entity of clause 53, wherein the configuration message indicates a rational, non-integer number.

Clause 57. A non-transitory, processor-readable storage medium comprising processor-readable instructions to cause a processor of a network entity to:
  determine a reference signal configuration for of a reference signal, with the reference signal configuration having at least one non-uniform-integer spacing between start times corresponding to at least one pair of consecutive transmissions of the reference signal; and
  transmit, from the network entity to a user equipment, a configuration message indicating the reference signal configuration.

Clause 58. The non-transitory, processor-readable storage medium of clause 57, wherein the configuration message indicates at least two separation values corresponding to different pairs of consecutive transmissions of the reference signal, each of the at least two separation values indicating an integer number of slots, with the at least two separation values indicating at least two different integer numbers of slots.

Clause 59. The non-transitory, processor-readable storage medium of clause 58, wherein the configuration message indicates a default number of slots for a default separation corresponding to the different pairs of consecutive transmissions of the reference signal, and wherein each of the at least two separation values comprises a default indication, indicating to use the default number of slots, or an indication of a specified number of slots, wherein the indication of the specified number of slots is an integer equal to the specified number of slots or an integer difference relative to the default number of slots.

Clause 60. The non-transitory, processor-readable storage medium of clause 57, wherein the configuration message indicates a rational, non-integer number.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment (UE) comprising:
a memory;
a transceiver; and
a processor, communicatively coupled to the memory and the transceiver, configured to:
operate in a non-uniform integer discontinuous reception (DRX) mode having non-uniform integer DRX cycles;
perform at least one of a positioning operation or a sensing operation, corresponding to a reference signal, based on the processor operating in the non-uniform integer DRX mode; and
perform, in response to the at least one of the positioning operation or the sensing operation being a semi-persistent operation or a periodic operation, the at least one of the positioning operation or the sensing operation based on whether a wake-up signal is received by the processor from the transceiver, in accordance with one or more default rules absent reception of the wake-up signal from the transceiver and the wake-up signal indicating how to perform the at least one of the positioning operation or the sensing operation.

2. The UE of claim 1, wherein the processor is configured to perform the at least one of the positioning operation or the sensing operation regardless of a timing of one or more ON durations of the non-uniform integer DRX mode.

3. The UE of claim 2, wherein the processor is configured to perform the at least one of the positioning operation or the sensing operation, regardless of the timing of the one or more ON durations of the non-uniform integer DRX mode, based on the at least one of the positioning operation or the sensing operation being an aperiodic operation.

4. The UE of claim 1, wherein the processor is configured to respond to the at least one of the positioning operation or the sensing operation being a semi-persistent operation or a periodic operation by performing the at least one of the positioning operation or the sensing operation at least partially overlapping in time with an ON duration of the non-uniform integer DRX mode.

5. The UE of claim 1, wherein the processor is configured to respond to the at least one of the positioning operation or the sensing operation being a semi-persistent operation or a periodic operation by performing the at least one of the positioning operation or the sensing operation in accordance with one or more indications received from the transceiver in the wake-up signal.

6. The UE of claim 1, wherein the processor is configured to transmit, via the transceiver, a request for a reference signal configuration for the reference signal with at least one non-uniform-integer spacing between consecutive transmissions of the reference signal.

7. The UE of claim 6, wherein the request indicates at least two separation values corresponding to the plurality of consecutive transmission pairs of at least three transmissions of the reference signal, each of the at least two separation values indicating an integer number of slots, with the at least two separation values indicating at least two different integer numbers of slots.

8. The UE of claim 7, wherein the request indicates a default number of slots for a default separation corresponding to the plurality of consecutive transmission pairs of the at least three transmissions of the reference signal, and wherein each of the at least two separation values comprises a default indication, indicating to use the default number of slots, or an indication of a specified number of slots, wherein the indication of the specified number of slots is an integer equal to the specified number of slots or an integer difference relative to the default number of slots.

9. The UE of claim 6, wherein the request indicates a rational number for the at least one non-uniform spacing.

10. A method, for at least one of positioning or sensing, comprising:
    operating a user equipment (UE) in a non-uniform integer discontinuous reception (DRX) mode having non-uniform integer DRX cycles; and
    performing, at the UE, at least one of a positioning operation or a sensing operation, corresponding to a reference signal, based on the UE operating in the non-uniform integer DRX mode, wherein the at least one of the positioning operation or the sensing operation is performed, in response to the at least one of the positioning operation or the sensing operation being a semi-persistent operation or a periodic operation, based on whether a wake-up signal is received by the UE from a network entity, in accordance with one or more default rules absent reception of the wake-up signal from the network entity and the wake-up signal indicating how to perform the at least one of the positioning operation or the sensing operation.

11. The method of claim 10, wherein the at least one of the positioning operation or the sensing operation is performed regardless of a timing of one or more ON durations of the non-uniform integer DRX mode.

12. The method of claim 11, wherein the at least one of the positioning operation or the sensing operation is performed, regardless of the timing of the one or more ON durations of the non-uniform integer DRX mode, based on the at least one of the positioning operation or the sensing operation being an aperiodic operation.

13. The method of claim 10, wherein the at least one of the positioning operation or the sensing operation is performed, in response to the at least one of the positioning operation or the sensing operation being a semi-persistent operation or a periodic operation, only if the at least one of the positioning operation or the sensing operation at least partially overlaps in time with an ON duration of the non-uniform integer DRX mode.

14. The method of claim 10, wherein the at least one of the positioning operation or the sensing operation is performed in accordance with one or more indications received in the wake-up signal.

15. The method of claim 10, further comprising transmitting, from the UE to a network entity, a request for a reference signal configuration for the reference signal with at least one non-uniform-integer spacing between consecutive transmissions of the reference signal.

16. The method of claim 15, wherein the request indicates at least two separation values corresponding to the plurality of consecutive transmission pairs of at least three transmissions of the reference signal, each of the at least two separation values indicating an integer number of slots, with the at least two separation values indicating at least two different integer numbers of slots.

17. The method of claim 16, wherein the request indicates a default number of slots for a default separation corresponding to the plurality of consecutive transmission pairs of the at least three transmissions of the reference signal, and wherein each of the at least two separation values comprises a default indication, indicating to use the default number of slots, or an indication of a specified number of slots, wherein the indication of the specified number of slots is an integer equal to the specified number of slots or an integer difference relative to the default number of slots.

18. The method of claim 15, wherein the request indicates a rational number for the at least one non-uniform spacing.

19. A user equipment (UE) comprising:
    means for operating in a non-uniform integer discontinuous reception (DRX) mode having non-uniform integer DRX cycles; and
    means for performing at least one of a positioning operation or a sensing operation, corresponding to a reference signal, based on the UE operating in the non-uniform integer DRX mode, wherein the means for performing the at least one of the positioning operation or the sensing operation comprise means for performing the at least one of the positioning operation or the sensing operation, in response to the at least one of the positioning operation or the sensing operation being a semi-persistent operation or a periodic operation, based on whether a wake-up signal is received by the UE from a network entity, in accordance with one or more default rules absent reception of the wake-up signal from the network entity and the wake-up signal indicating how to perform the at least one of the positioning operation or the sensing operation.

20. The UE of claim 19, wherein the means for performing the at least one of the positioning operation or the sensing operation comprise means for performing the at least one of the positioning operation or the sensing operation regardless of a timing of one or more ON durations of the non-uniform integer DRX mode.

21. The UE of claim 20, wherein the means for performing the at least one of the positioning operation or the sensing operation comprise means for performing the at least one of the positioning operation or the sensing operation, regardless of the timing of the one or more ON durations of the non-uniform integer DRX mode, based on the at least one of the positioning operation or the sensing operation being an aperiodic operation.

22. The UE of claim 19, wherein the means for performing the at least one of the positioning operation or the sensing operation comprise means for performing the at least one of the positioning operation or the sensing operation, in response to the at least one of the positioning operation or the sensing operation being a semi-persistent operation or a periodic operation, only if the at least one of the positioning operation or the sensing operation at least partially overlaps in time with an ON duration of the non-uniform integer DRX mode.

23. The UE of claim 19, wherein the means for performing the at least one of the positioning operation or the sensing operation comprise means for performing the at least one of the positioning operation or the sensing operation in accordance with one or more indications received in the wake-up signal.

24. A non-transitory, processor-readable storage medium comprising processor-readable instructions to cause a processor of a user equipment (UE) to:
    operate in a non-uniform integer discontinuous reception (DRX) mode having non-uniform integer DRX cycles;

perform at least one of a positioning operation or a sensing operation, corresponding to a reference signal, based on the UE operating in the non-uniform integer DRX mode; and perform, in resonse to the at least one of the positioning operation or the sensing operation being a semi-persistent operation or a periodic operation, the at least one of the positioning operation or the sensing operation based on whether a wake-up signal is received by the processor from the transceiver, in accordance with one or more default rules absent reception of the wake-up signal from the transceiver and the wake-up signal indicating how to perform the at least one of the positioning operation or the sensing operation.

* * * * *